(12) United States Patent
Zhang et al.

(10) Patent No.: US 12,156,044 B2
(45) Date of Patent: Nov. 26, 2024

(54) REPORTING METHOD AND CONFIGURATION METHOD FOR MINIMIZATION OF DRIVE TESTS INFORMATION, TERMINAL AND NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaoran Zhang, Beijing (CN); Nan Hu, Beijing (CN); Liang Liu, Beijing (CN); Nan Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 613 days.

(21) Appl. No.: 17/430,785

(22) PCT Filed: Feb. 13, 2020

(86) PCT No.: PCT/CN2020/075029
§ 371 (c)(1),
(2) Date: Aug. 13, 2021

(87) PCT Pub. No.: WO2020/164538
PCT Pub. Date: Aug. 20, 2020

(65) Prior Publication Data
US 2022/0132332 A1    Apr. 28, 2022

(30) Foreign Application Priority Data
Feb. 15, 2019    (CN) .......................... 201910118123.8

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 24/10* (2013.01); *H04W 84/042* (2013.01)

(58) Field of Classification Search
CPC ..... H04W 24/02; H04W 24/10; H04W 24/08; H04W 17/24; H04W 17/327; H04W 84/042
See application file for complete search history.

(56) References Cited

U.S. PATENT DOCUMENTS

| 8,768,335 B2 * | 7/2014 | Yi | .......................... H04W 24/10 455/452.2 |
| 8,787,834 B2 | 7/2014 | Lee et al. | |

(Continued)

FOREIGN PATENT DOCUMENTS

| CN | 102209343 A | 10/2011 |
| CN | 102348219 A | 2/2012 |

(Continued)

OTHER PUBLICATIONS

International Search Report in the international application No. PCT/CN2020/075029, mailed on Apr. 22, 2020, 2 pgs.

(Continued)

*Primary Examiner* — Jamal Javaid
(74) *Attorney, Agent, or Firm* — Cooper Legal Group, LLC (57) ABSTRACT

Embodiments of the present disclosure provide a reporting method and a configuration method for minimization of drive tests information, a terminal and a network device. The reporting method applied to a terminal side comprises:

(Continued)

receiving configuration information sent by a network device for a minimization of drive tests information report; creating, according to the configuration information, a measurement log regarding minimization of drive tests information; and reporting to the network device, the measurement log regarding the minimization of drive tests information.

15 Claims, 2 Drawing Sheets

(51) Int. Cl.
*H04W 24/10* (2009.01)
*H04W 84/04* (2009.01)

(56) References Cited

U.S. PATENT DOCUMENTS

| | | |
|---|---|---|
| 8,831,586 B2 | 9/2014 | Gao |
| 9,154,989 B2 | 10/2015 | Lee et al. |
| 9,807,636 B2 | 10/2017 | Lee et al. |
| 2011/0195668 A1* | 8/2011 | Lee .................. H04W 24/10 455/67.11 |
| 2013/0012188 A1 | 1/2013 | Gao et al. |
| 2014/0242974 A1 | 8/2014 | Lee et al. |
| 2015/0004970 A1* | 1/2015 | Venkatachari .... H04W 36/0061 455/434 |
| 2015/0373573 A1 | 12/2015 | Lee et al. |

FOREIGN PATENT DOCUMENTS

| | | | |
|---|---|---|---|
| CN | 102546282 | A | 7/2012 |
| CN | 102740327 | A | 10/2012 |
| CN | 102752787 | A | 10/2012 |
| CN | 102754469 | A | 10/2012 |
| CN | 103718592 | A | 4/2014 |
| CN | 106211204 | A | 12/2016 |
| CN | 106899988 | A | 6/2017 |
| CN | 107241749 | A | 10/2017 |
| WO | 2015113309 | A1 | 8/2015 |

OTHER PUBLICATIONS

English translation of the Written Opinion of the International Search Authority in the international application No. PCT/CN2020/075029, mailed on Apr. 22, 2020, 4 pgs.

First Office Action of the Chinese application No. 201910118123.8, issued on Mar. 19, 2021, 15 pgs.

* cited by examiner

REPORTING METHOD AND CONFIGURATION METHOD FOR MINIMIZATION OF DRIVE TESTS INFORMATION, TERMINAL AND NETWORK DEVICE

CROSS-REFERENCE TO RELATED APPLICATION

The application claims priority to Chinese Patent Application No. 201910118123.8 filed on Feb. 15, 2019, the entire contents of which are hereby incorporated by reference.

TECHNICAL FIELD

The disclosure relates to the technical field of communication, and in particular to a reporting method and a configuration method for minimization of drive tests (MDT) information, a terminal and a network device.

BACKGROUND

In an MDT technology, a commercial terminal automatically performs drive tests, logs and reports data to a base station, and the base station collects and reports the drive tests data to Operation Administration and Maintenance (OAM), to implement operations of data measurement and collection. The MDT technology is an important means for wireless network optimization and network quality assessment.

In Long Term Evolution (LTE), the MDT technology supports a terminal to log measurement results of Reference Signal Received Power (RSRP) and Reference Signal Received Quality (RSRQ) in an idle state, log abnormal events such as random access failure or the like, and report logged data to a network next time when entering a connected state.

For unlicensed frequency and a dedicated network (for example, a non-ground network) except a ground mobile communication system that operates in licensed frequency, MDT is also an important means for network optimization and network quality assessment. Besides inheriting similar functions in LTE MDT, the following problems may also occur.

Contention-based access is applied to the unlicensed frequency, and base stations of multiple operators may be deployed on the same carrier, so that a cell measured by a terminal in an idle state/inactive state does not always belong to a Public Land Mobile Network (PLMN) where a user is registered. Due to limited measurement capability of the terminal (for example, the terminal may measure eight intra-frequency cells and four inter-frequency cells), detecting the cell that does not belong to the registration PLMN is unfavorable for power saving of the terminal in the idle state, meanwhile may limit the measurement capability of the terminal. In addition, since multiple operators are deployed on one carrier, Physical Cell Identifiers (PCIs) of cells of different operators may conflict, namely the same PCI is applied in adjacent cells that belong to different operators, which may cause occurrence of interferences and make it impossible to detect PCIs correctly.

The terminal in the idle state is also required to log such abnormal event, and report the logged abnormal event to the network in the connected state to assist in network optimization.

The dedicated network (for example, the non-ground network): for some special scenes such as the non-ground network and over-the-air coverage, dedicated frequencies and devices may be required to be adopted, and such cell serves a dedicated service. When an ordinary ground terminal accesses such cell, it may cause interferences or a dedicated resource may be consumed. Therefore, when the terminal detects and reselects the cell, an Identifier (ID) of the cell is required to be logged and notified to the network to assist in network optimization.

SUMMARY

The disclosure provides a reporting method and a configuration method for MDT information, a terminal and a network device, to assist in network optimization.

In order to solve the foregoing technical problem, embodiments of the disclosure provide the following solutions.

A method for reporting MDT information may be applied to a terminal, and include the following operations.

Configuration information for reporting the MDT information transmitted by a network device is received.

Measurement log for the MDT information is performed according to the configuration information.

Logged measurements of MDT are reported to the network device, the logged measurements of MDT including information that a best cell is unsuitable for camping on.

Here in response to the terminal being in an idle state or an inactive state, the configuration information may include at least one of: indicating at least one of logging or reporting of unlicensed frequency;

indicating at least one of logging or reporting of a cell ID; or a timer for logging time of performing the measurement log by the terminal.

Here the operation that the logging of MDT is performed according to the configuration information may include the following operations.

In response to the terminal successfully detecting an effective signal in a measurement window and the timer not expiring, the measurement log is continued.

Here the method for reporting MDT information may further include the following operations. In response to not detecting an effective signal in a measurement window, the logging is stopped, state information that an effective reference signal is not received is logged, and the timer keeps running.

Here the operation that the logged measurements of MDT are reported to the network device may include the following operations.

The logged measurements of MDT are transmitted and reported to the network device, during setup, handover or re-setup of connection with the network device.

The reported logged measurements of MDT may further include at least one of: PCI conflict information, a Received Signal Strength Indicator (RSSI), a channel occupancy rate, position information, or time information of performing the measurement log by the terminal.

Here in response to the terminal being in a connected state, the configuration information may include at least one of: reporting at least one of a PLMN, a PCI, a cell ID, or a Cell Global Identifier (CGI); reporting a measurement result; or reporting position information.

The method for reporting MDT information may further include the following operations.

A blacklist cell list, a whitelist cell list, an other cell list, or a PCI for replacement transmitted by the network device is received.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

The embodiments of the disclosure also provide a method for configuring reporting of MDT information, which may be applied to a network device and include the following operations.

Configuration information for the reporting of MDT information is transmitted to a terminal.

Logged measurements of MDT reported by the terminal are received, the logged measurements of MDT including information that a best cell is unsuitable for camping on.

The method for configuring reporting of MDT information may further include the following operations.

A blacklist cell list, a whitelist cell list, an other cell list, or a PCI for replacement for the terminal is generated according to the logged measurements of MDT.

The blacklist cell list, the whitelist cell list, the other cell list, or the PCI for replacement for the terminal is transmitted to the terminal.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

Here in response to the terminal being in an idle state or an inactive state, the configuration information may include at least one of: indicating at least one of logging or reporting of unlicensed frequency; indicating at least one of logging or reporting of a cell ID; or a timer for logging time of performing the measurement log by the terminal.

Here in response to the terminal being in a connected state, the configuration information may include at least one of: reporting at least one of a PLMN, a PCI, a cell ID, or a CGI; reporting a measurement result; or reporting position information.

The embodiments of the disclosure also provide a terminal, which may include a transceiver and a processor.

The transceiver may be configured to receive configuration information for reporting MDT information transmitted by a network device.

The processor may be configured to perform measurement log for the MDT information according to the configuration information.

The transceiver may further be configured to report logged measurements of MDT to the network device, the logged measurements of MDT including information that a best cell is unsuitable for camping on.

The embodiments of the disclosure also provide a network device, which may include a transceiver.

The transceiver may be configured to transmit configuration information for reporting MDT information to a terminal, and to receive logged measurements of MDT reported by the terminal, the logged measurements of MDT including information that a best cell is unsuitable for camping on.

The embodiments of the disclosure also provide a communication device, which may include a processor and a memory storing a computer program, the computer program being executed by the processor to execute the above-mentioned method.

The embodiments of the disclosure also provide a computer-readable storage medium, which may include an instruction, the instruction being executed in a computer to enable the computer to execute the above-mentioned method.

The solutions of the disclosure have at least the following beneficial effects.

According to the solutions of the disclosure, configuration information for reporting the MDT information transmitted by a network device is received; measurement log for the MDT information is performed according to the configuration information; logged measurements of MDT are reported to the network device; and further, a blacklist cell list, a whitelist cell list, an other cell list, or a PCI for replacement for the terminal transmitted by the network device is received, so that the terminal may not measure cells in the blacklist cell list or the other cell list any more or may not replace the PCI, to assist in network optimization.

BRIEF DESCRIPTION OF THE DRAWINGS

In order to describe the technical solutions of the embodiments of the disclosure more clearly, the drawings required to be used in the descriptions of the embodiments of the disclosure will be simply introduced below. It is apparent that the drawings described below are merely some embodiments of the disclosure. Other drawings may further be obtained by those of ordinary skill in the art according to these drawings without paying any creative work.

DETAILED DESCRIPTION

Exemplary embodiments of the disclosure will be described now with reference to the drawings in more detail. Although the exemplary embodiments of the disclosure are shown in the drawings, it should be understood that the disclosure may be implemented in various forms and should not be limited to the embodiments described here. Instead, these embodiments are provided to make the disclosure understood more thoroughly and completely deliver the scope of the disclosure to those skilled in the art.

Figure 1:
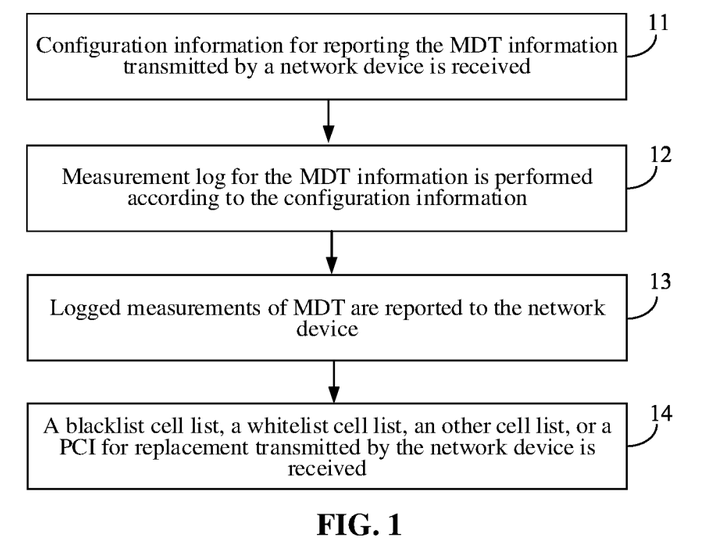
FIG. 1 is a flowchart of a method for reporting MDT information according to an embodiment of the disclosure.

As shown in FIG. 1, an embodiment of the disclosure provides a method for reporting MDT information, which may be applied to a terminal, and include the following operations.

In operation 11, configuration information for reporting the MDT information transmitted by a network device is received.

In operation 12, measurement log for the MDT information is performed according to the configuration information, to obtain an MDT report.

In operation 13, logged measurements of MDT are reported to the network device, the logged measurements of MDT including information that a best cell is unsuitable for camping on.

According to the embodiment of the disclosure, the network device generates a blacklist cell list, a whitelist cell list, an other cell list, or a PCI for replacement for the terminal according to the logged measurements of MDT, and then the terminal receives the blacklist cell list, the whitelist cell list, the other cell list, or the PCI for replacement for the terminal transmitted by the network device, so that the terminal may not measure cells in the blacklist cell list or the other cell list any more or replace the PCI, to assist in network optimization.

In an embodiment, in response to the terminal being in an idle state or an inactive state, the configuration information may include at least one of: indicating at least one of logging or reporting of unlicensed frequency; indicating at least one of logging or reporting of a cell ID; or a timer for logging time of performing the measurement log by the terminal.

In the operation 12, in response to the terminal successfully detecting an effective signal in a measurement window and the timer not expiring, the measurement log is continued.

In response to not detecting an effective signal in a measurement window, the logging is stopped, state information that an effective reference signal is not received is logged, and the timer keeps running.

The operation 13 may specifically include the following operations.

The logged measurements of MDT are reported to the network device, during setup, handover or re-setup of connection with the network device.

Here the logged measurements of MDT may further include at least one of: PCI conflict information, a RSSI, a channel occupancy rate, position information, or time information of performing the measurement log by the terminal.

Furthermore, in the embodiment, the following operations may further be included.

In operation 14, a blacklist cell list, a whitelist cell list, an other cell list, or a PCI for replacement transmitted by the network device is received.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

Specifically, for a terminal in the idle state/the inactive state, logging of MDT may include the following operations.

In a first operation, the network device (for example, a base station) transmits configuration information for logging MDT to the terminal through a Radio Resource Control (RRC) message (for example, Logged Measurement Configuration). The configuration information may include at least one of: indicating at least one of logging or reporting of unlicensed frequency; indicating at least one of logging or reporting of a cell ID; or a timer for logging time of performing the measurement log by the terminal.

In a second operation, after the terminal receives the configuration information transmitted by the base station, and the terminal enters the idle state/the inactive state, logging of logged MDT is performed according to an instruction of the base station.

Furthermore, since contention-based access is applied to the unlicensed frequency, in response to the terminal not detecting an effective signal in a measurement window (for example, the base station fails in Listen Before Talk (LBT) and does not successfully transmit any signal), the terminal stops the measurement log. Meanwhile, occurrence of the condition that the effective reference signal is not received, is logged (at least one of specific position information or time may further be reported), and meanwhile the timer keeps running.

In response to the terminal successfully detecting an effective signal in a measurement window (for example, the base station succeeds in LBT) and meanwhile the timer not expiring, the measurement log is continued.

In a third operation, the terminal indicates the network that there is an available logged MDT. The indication may be made during connection setup (for example, through an RRC connection setup complete message), or during handover or re-setup.

In a fourth operation, after the base station receives the indication of the terminal in the third operation, the base station may request the terminal for the logged MDT, for example, through RRC signaling.

In a fifth operation, the terminal reports the logged MDT, which may include one or more of:

information that a best cell is unsuitable for camping on, PCI conflict information, a RSSI, a channel occupancy rate, position information, or time information of performing the measurement log by the terminal.

PCI conflict: for example, the terminal measures a certain cell of which a PCI is the same as a PCI in a measurement configuration transmitted in a system message, but it is found that a PLMN corresponding to the cell is not a PLMN where the terminal is registered or an Equivalent PLMN (E-PLMN) after reselecting the previously-read system message, it indicates that there is a PCI conflict between operators in the same geographic region. In such case, the terminal may report a PLMN/PCI/cell ID/CGI of the cell involved in the PCI conflict, furthermore, the terminal may report at least one of specific position information or time information.

When the cell belonging to the PLMN or E-PLMN where registration does not occur is reselected, at least one of the specific position information or time information is further reported.

For mobile network information of the cell, for example, the PLMN/PCI/cell ID/CGI: at least one of the specific position information or time information is further reported.

A measurement result includes RSRP, RSRQ, the RSSI, the channel occupancy rate, etc. Here the channel occupancy rate is a percentage of samples of which RSSIs are greater than a certain threshold.

In a sixth operation, after the base station receives the reported log, when a cell that does not belong to a present operator is found in the log, and/or when the cell belonging to the PLMN where registration does not occur is reselected, and/or when the PLMN where registration does not occur causes at least one of the reselection failure or the PCI conflict, the base station may perform the following operations.

The cell is added to the blacklist cell list (for example, the PCI of the cell is added to the blacklist). In such case, the terminal may not measure the cell any more.

The PCI of the cell is added to an other cell list. The cell list may be labeled as other PLMN, and represents a cell that works on the same frequency point as a serving cell but does not belong to the PLMN of the present operator. The terminal knows that reselection of the cell in the list may cause a failure upon receiving the list transmitted by the base station.

The cell is added to an other cell list. The cell list may be labeled as other PLMN, and represents a cell that does not belong to the PLMN of the present operator on a present frequency point/carrier. The terminal knows that the cell in the list cannot be reselected upon receiving the list transmitted by the base station.

In response to finding the PCI conflict, the same PCI is adopted for cells of other operators and the cell of the present operator in the same geographic region, and the network may consider replacement of the PCI.

Or, the base station may configure the whitelist cell list, and the terminal is only required to measure a cell in the whitelist. The whitelist cell list includes at least one of the cell of the present operator or a cell that belongs to the PLMN where the terminal is registered.

In another embodiment, in response to the terminal being in a connected state, the method may further include the following operations.

In operation 111, configuration information for reporting the MDT information transmitted by a network device is received, the configuration information including at least one of: reporting at least one of a PLMN, a PCI, a cell ID, or a CGI; reporting a measurement result; or reporting position information.

In operation 121, measurement log for the MDT information is performed according to the configuration information.

In operation 131, logged measurements of MDT are reported to the network device, the logged measurements of MDT including information that a best cell is unsuitable for camping on.

Furthermore, the following operations may further be included.

In operation 141, a blacklist cell list, a whitelist cell list, an other cell list, or a PCI for replacement transmitted by the network device is received.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

Specifically, for a terminal in the connected state, the process of reporting MDT includes the following operations.

In a first operation, the network device (for example, a base station) instructs the terminal in the connected state to report MDT through a RRC message. The instruction may include at least one of: reporting a PLMN/PCI/cell ID/CGI, etc.; reporting a measurement result including RSRP/RSRQ/RSSI/channel occupancy rate, etc., here the channel occupancy rate is a percentage of samples of which RSSIs are greater than a certain threshold; reporting position information.

In a second operation, the terminal performs corresponding measurement and reporting after receiving a configuration of the network.

In a third operation, in response to the network finding a cell that does not belong to a PLMN of a present operator in the measurement after receiving reporting of the measurement, or in response to reporting the PCI only in the first and second operations, the network may configure the terminal to further read a CGI/PLMN/cell ID of the cell. The terminal reads and reports the CGI/PLMN/cell ID of the cell to the network after receiving the configuration. The network judges whether there is a PCI conflict through the reported contents, and if so, the network may perform the following operations.

The cell is added to an other cell list. The cell list may be labeled as other PLMN, and represents a cell that does not belong to the PLMN of the present operator on a present frequency point/carrier. The terminal may measure the cell in the list according to a low priority, or may not measure the cell in the list, upon receiving the cell list transmitted by the base station.

Or, in response to finding the PCI conflict, the same PCI is adopted for cells of other operators and the cell of the present operator in the same geographic region, and the network may consider replacement of the PCI.

Or, the base station may configure the whitelist cell list, and the terminal is only required to measure a cell in the whitelist.

According to the embodiment of the disclosure, the terminal performs logging and reporting of MDT to assist the network in solving the problem of coexistence of multiple operators on the unlicensed frequency.

Figure 2:
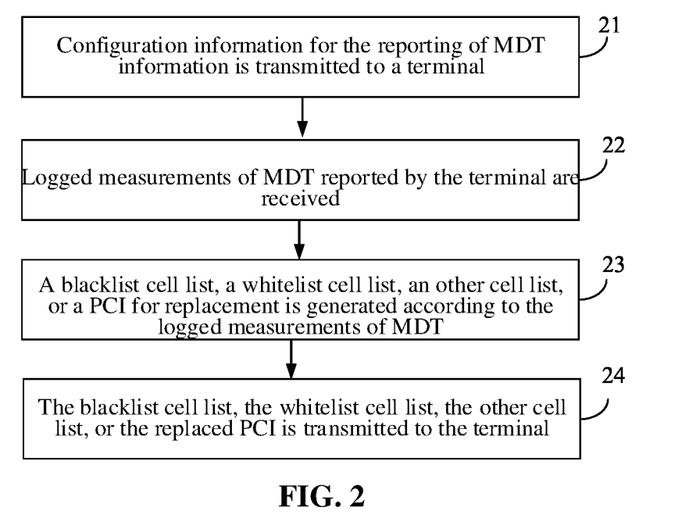
FIG. 2 is a flowchart of a method for configuring reporting of MDT information according to an embodiment of the disclosure.

As shown in FIG. 2, an embodiment of the disclosure also provides a method for configuring reporting of MDT information, which may be applied to a network device and include the following operations.

In operation 21, configuration information for the reporting of MDT information is transmitted to a terminal.

In operation 22, logged measurements of MDT reported by the terminal are received, the logged measurements of MDT including information that a best cell is unsuitable for camping on.

Here the method for configuring reporting of MDT information may further include the following operations.

In operation 23, a blacklist cell list, a whitelist cell list, an other cell list, or a PCI for replacement is generated according to the logged measurements of MDT.

In operation 24, the blacklist cell list, the whitelist cell list, the other cell list, or the replaced PCI is transmitted to the terminal.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

Here in response to the terminal being in an idle state or an inactive state, the configuration information may include at least one of: indicating at least one of logging or reporting of unlicensed frequency; indicating at least one of logging or reporting of a cell ID; or a timer for logging time of performing the measurement log by the terminal.

Here in response to the terminal being in a connected state, the configuration information may include at least one of: reporting at least one of a PLMN, a PCI, a cell ID, or a CGI; reporting a measurement result; or reporting position information.

It should be noted that the network device may be a base station, etc., the method for the network device side is a method corresponding to the method for the terminal side, and all implementing embodiments of the method for the terminal side are applicable to the method for the network device side, and may achieve the same technical effect.

Figure 3:
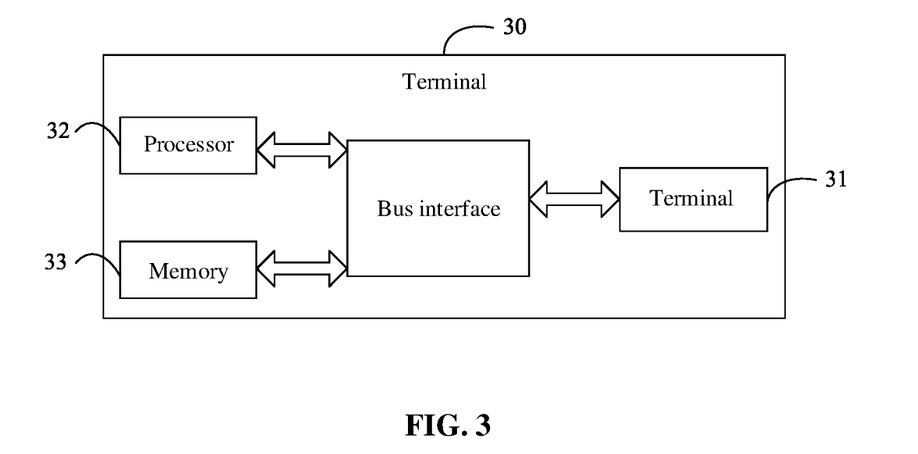
FIG. 3 is a schematic architecture diagram of a terminal according to the disclosure.

As shown in FIG. 3, an embodiment of the disclosure also provides a terminal 30, which may include a transceiver 31 and a processor 32.

The transceiver 31 may be configured to receive configuration information for reporting MDT information transmitted by a network device.

The processor 32 may be configured to perform measurement log for the MDT information according to the configuration information.

The transceiver 31 may further be configured to report logged measurements of MDT to the network device, the logged measurements of MDT including information that a best cell is unsuitable for camping on.

Here, in response to the terminal being in an idle state or an inactive state, the configuration information may include at least one of: indicating at least one of logging or reporting of unlicensed frequency; indicating at least one of logging or reporting of a cell ID; or a timer for logging time of performing the measurement log by the terminal.

Here the processor 32 is specifically configured to, in response to successfully detecting an effective signal in a measurement window and the timer not expiring, continue the measurement log.

Here the processor 32 is further configured to, in response to not detecting an effective signal in a measurement window, stop the logging, log state information that an effective reference signal is not received, and keep the timer running.

Here the transceiver 31 is specifically configured to transmit and report the logged measurements of MDT to the network device, during setup, handover or re-setup of connection with the network device.

Here the reported logged measurements of MDT may include at least one of: information that a best cell is unsuitable for camping on, PCI conflict information, a RSSI, a channel occupancy rate, position information, or time information of performing the measurement log by the terminal.

Here in response to the terminal being in a connected state, the configuration information may include at least one of: reporting at least one of a PLMN, a PCI, a cell ID, or a CGI; reporting a measurement result; or reporting position information.

Here the transceiver 31 is further configured to receive a blacklist cell list, a whitelist cell list, an other cell list, or a PCI for replacement transmitted by the network device.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

It should be noted that the terminal is a terminal corresponding to the method shown in FIG. 1, and all implementations in the method embodiment are applicable to the embodiment of the terminal, and may also achieve the same technical effect. The terminal may further include a memory 33. Connection between the transceiver 31 and the processor 32, and connection between the transceiver 32 and the memory 33 may be implemented through a bus interface. A function of the transceiver 31 may be implemented by the processor 32. A function of the processor 32 may also be implemented by the transceiver 31.

Figure 4:
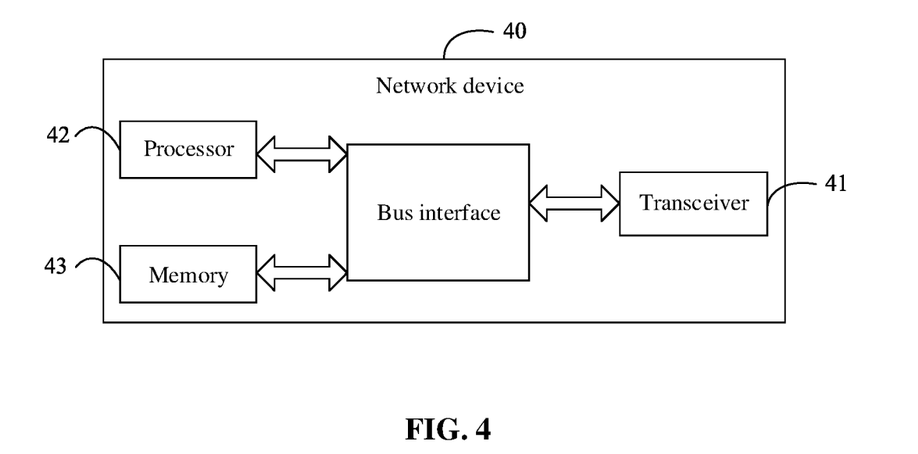
FIG. 4 is a schematic architecture diagram of a network device according to the disclosure.

As shown in FIG. 4, an embodiment of the disclosure also provides a network device 40, which may include a transceiver 41.

The transceiver 41 may be configured to transmit configuration information for reporting MDT information to a terminal, and to receive logged measurements of MDT reported by the terminal, the logged measurements of MDT including information that a best cell is unsuitable for camping on.

Here the network device 40 may further include a processor configured to generate a blacklist cell list, a whitelist cell list, an other cell list, or a PCI for replacement for the terminal according to the logged measurements of MDT.

The transceiver 41 may further be configured to transmit the blacklist cell list, the whitelist cell list, the other cell list, or the PCI for replacement for the terminal to the terminal.

The blacklist cell list may include at least one of a cell that does not belong to a present operator or a cell that does not belong to a PLMN where the terminal is registered.

The whitelist cell list may include at least one of a cell that belongs to the present operator or a cell that belongs to the PLMN where the terminal is registered.

The other cell list may represent a cell that does not belong to a PLMN of the present operator, or a cell that does not belong to the PLMN of the present operator on a present frequency point/carrier.

Here in response to the terminal being in an idle state or an inactive state, the configuration information may include at least one of: indicating at least one of logging or reporting of unlicensed frequency; indicating at least one of logging or reporting of a cell ID; or a timer for logging time of performing the measurement log by the terminal.

Here in response to the terminal being in a connected state, the configuration information may include at least one of: reporting at least one of a PLMN, a PCI, a cell ID, or a CGI; reporting a measurement result; or reporting position information.

It should be noted that the network device is a network device corresponding to the method shown in FIG. 2, and all implementations in the method embodiment are applicable to the embodiment of the network device, and may also achieve the same technical effect. The network device 40 may further include a memory 43. Connection between the transceiver 41 and the processor 42, and connection between the transceiver 42 and the memory 43 may be implemented through a bus interface. A function of the transceiver 41 may be implemented by the processor 42. A function of the processor 42 may also be implemented by the transceiver 41.

An embodiment of the disclosure also provides a communication device, which may include a processor and a memory storing a computer program, the computer program being executed by the processor to execute the method shown in FIG. 1 or FIG. 2.

An embodiment of the disclosure also provides a computer-readable storage medium, which may include an instruction, the instruction being executed in a computer to enable the computer to execute the method shown in FIG. 1 or FIG. 2.

Those of ordinary skill in the art may realize that the units and algorithm steps of each example described in combination with the embodiments disclosed in the disclosure may be implemented by an electronic hardware or a combination of a computer software and the electronic hardware. Whether these functions are executed in a hardware or software manner depends on specific applications and design constraints of the technical solutions. Professionals may implement the described functions for each specific application by use of different methods, but such implementation shall not be considered as going beyond the scope of the disclosure.

Those skilled in the art may clearly learn that specific working processes of the system, device and unit described above may refer to the corresponding processes in the method embodiment and will not be elaborated here for convenient and brief description.

In the embodiments provided by the disclosure, it should be understood that the disclosed device and method may be implemented in other manners. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection implemented through some interfaces, devices or units, and may be electrical, mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions in the embodiments according to a practical requirement.

In addition, each functional unit in each of the embodiments of the disclosure may be integrated into a processing unit, each unit may also physically exist independently, and two or more than two units may also be integrated into a unit.

When being realized in form of software functional unit and sold or used as an independent product, the function may be stored in a computer-readable storage medium. Based on such an understanding, the technical solutions of the disclosure substantially or parts making contributions to the conventional art or part of the technical solutions may be embodied in form of a software product, and the computer software product is stored in a storage medium, including multiple instructions configured to enable a computer device (which may be a personal computer, a server, a network device or the like) to execute all or part of the steps of the method according to each of the embodiments of the disclosure. The storage medium includes: various media capable of storing program codes such as a U disk, a mobile hard disk, a Read-Only Memory (ROM), a Random Access Memory (RAM), a magnetic disk or an optical disk, etc.

Furthermore, it should be pointed out that each component or each operation in the device and method of the disclosure may be split and/or recombined apparently. Such splitting and/or recombination should be considered as equivalent solutions of the disclosure. Moreover, the operations implementing the series of processes may be naturally executed according to a time sequence of description, but are not required to be executed always according to the time sequence, and some operations may be executed concurrently or independently. It may be understood by those of ordinary skill in the art that all or any operations or components of the method and device of the disclosure may be implemented by a hardware, firmware, software, or a combination thereof in any computing apparatus (including a processor, a storage medium, etc.) or a network of the computing apparatus. This may be implemented by those of ordinary skill in the art using their basic programming skills after reading the description of the disclosure.

Therefore, the objective of the disclosure may also be achieved by executing a program or a group of programs in any computing apparatus. The computing apparatus may be a well-known universal apparatus. Therefore, the objective of the disclosure may also be achieved by providing only a program product including a program code that implements the method or the device. That is to say, the program product also forms the disclosure, and a storage medium storing the program product also forms the disclosure. Apparently, the storage medium may be any well-known storage medium or any storage medium to be developed in the future. It should also be pointed out that each component or each operation in the device and method of the disclosure may be split and/or recombined apparently. Such splitting and/or recombination should be considered as equivalent solutions of the disclosure. Moreover, the operations implementing the series of processes may be naturally executed according to a time sequence of description, but are not required to be executed always according to the time sequence, and some operations may be executed concurrently or independently.

It may be understood that these embodiments described in the embodiments of the disclosure may be implemented by a hardware, software, firmware, middleware, microcode, or a combination thereof. In case of implementation with the hardware, the unit, module, subunit and submodule may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), universal processors, controllers, microcontrollers, microprocessors, other electronic units configured to execute the functions described in the disclosure, or a combination thereof.

In case of implementation with the software, the technology described in the embodiments of the disclosure may be implemented through the modules (for example, processes, functions, etc.) executing the functions described in the embodiments of the disclosure. A software code may be stored in the memory and executed by the processor. The memory may be implemented in the processor or outside the processor.

Described above are optional implementation modes of the disclosure. It should be pointed out that those of ordinary skill in the art may further make several improvements and embellishments without departing from the principle of the disclosure, and these improvements and embellishments shall also fall within the scope of protection of the disclosure.

The invention claimed is:
1. A method for reporting logged measurements, applied to a terminal and comprising:
receiving configuration information for reporting the logged measurements transmitted by a network device;
performing measurement log; and reporting the logged measurements to the network device, the logged measurements comprising information that a highest ranked cell or a best cell is unsuitable or fails to camp on,
wherein in response to the terminal being in an idle state or an inactive state, the configuration information comprises at least one of:
  indicating at least one of logging or reporting of an unlicensed frequency;
  indicating at least one of logging or reporting of a cell Identifier (ID) or a Physical Cell Identifier (PCI); or
  a timer for logging time of performing the measurement log by the terminal,
wherein the performing the measurement log comprises:
  in response to the terminal successfully detecting an effective signal in a measurement window and the timer not expiring, continuing the measurement log.

2. The method for reporting logged measurements of claim 1, further comprising:
in response to not detecting the effective signal in the measurement window, stopping the logging, logging state information that an effective reference signal is not received, and keeping the timer running.

3. The method for reporting logged measurements of claim 1, wherein reporting the logged measurements to the network device comprises:
transmitting and reporting the logged measurements to the network device, during setup, handover or re-setup of connection with the network device.

4. The method for reporting logged measurements of claim 1, wherein the logged measurements further comprise at least one of:
PCI conflict information;
a Received Signal Strength Indicator (RSSI);
a channel occupancy rate;
position information; or
time information of performing the measurement log by the terminal.

5. The method for reporting logged measurements of claim 1, wherein in response to the terminal being in a connected state, the configuration information comprises at least one of:
reporting at least one of a Public Land Mobile Network (PLMN), the PCI, the cell ID, or a Cell Global Identifier (CGI);
reporting a measurement result; or
reporting position information.

6. The method for reporting logged measurements of claim 1, further comprising:
receiving a blacklist cell list, a whitelist cell list, an other cell list, or a PCI for replacement transmitted by the network device,
wherein the blacklist cell list comprises at least one of a cell that does not belong to a present operator or a cell that does not belong to a Public Land Mobile Network (PLMN) where the terminal is registered;
the whitelist cell list comprises at least one of a cell that belongs to the present operator or a cell that belongs to the PLMN where the terminal is registered; and
the other cell list represents a cell that does not belong to a PLMN of the present operator, or a cell that does not belong to the PLMN of the present operator on a present frequency point/carrier.

7. A method for configuring reporting of logged measurements, applied to a network device and comprising:
transmitting configuration information for the reporting of the logged measurements to a terminal; and
receiving the logged measurements reported by the terminal, the logged measurements comprising information that a highest ranked cell or a best cell is unsuitable or fails to camp on,
wherein
in response to the terminal being in a connected state, the configuration information comprises at least one of:
  reporting at least one of a Public Land Mobile Network (PLMN), a Physical Cell Identifier (PCI), a cell Identifier (ID), or a Cell Global Identifier (CGI);
  reporting a measurement result; or
  reporting position information.

8. The method for configuring reporting of logged measurements of claim 7, further comprising:
generating, according to the logged measurements, a blacklist cell list, a whitelist cell list, an other cell list, or a PCI for replacement for the terminal; and
transmitting the blacklist cell list, the whitelist cell list, the other cell list, or the PCI for replacement for the terminal to the terminal,
wherein the blacklist cell list comprises at least one of a cell that does not belong to a present operator or a cell that does not belong to a PLMN where the terminal is registered;
the whitelist cell list comprises at least one of a cell that belongs to the present operator or a cell that belongs to the PLMN where the terminal is registered; and
the other cell list represents a cell that does not belong to a PLMN of the present operator, or a cell that does not belong to the PLMN of the present operator on a present frequency point/carrier.

9. The method for configuring reporting of logged measurements of claim 7, wherein in response to the terminal being in an idle state or an inactive state, the configuration information comprises at least one of:
indicating at least one of logging or reporting of an unlicensed frequency;
indicating at least one of logging or reporting of the cell ID or the PCI; or
a timer for logging time of performing measurement log by the terminal.

10. A terminal, comprising:
a transceiver configured to receive configuration information for reporting logged measurements transmitted by a network device; and
a processor configured to perform measurement log,
wherein the transceiver is further configured to report the logged measurements to the network device, the logged measurements comprising information that a highest ranked cell or a best cell is unsuitable or fails to camp on,
wherein in response to the terminal being in an idle state or an inactive state, the configuration information comprises at least one of:
  indicating at least one of logging or reporting of an unlicensed frequency;
  indicating at least one of logging or reporting of a cell Identifier (ID) or a Physical Cell Identifier (PCI); or
  a timer for logging time of performing the measurement log by the terminal,
wherein the processor is further configured to:
  in response to the terminal successfully detecting an effective signal in a measurement window and the timer not expiring, continue the measurement log.

11. The terminal of claim 10, wherein the processor is further configured to:

in response to not detecting the effective signal in the measurement window, stop the logging, log state information that an effective reference signal is not received, and keep the timer running.

12. The terminal of claim 10, wherein the transceiver is further configured to:
transmit and report the logged measurements to the network device, during setup, handover or re-setup of connection with the network device.

13. The terminal of claim 10, wherein the logged measurements further comprise at least one of:
PCI conflict information;
a Received Signal Strength Indicator (RSSI);
a channel occupancy rate;
position information; or
time information of performing the measurement log by the terminal.

14. The terminal of claim 10, wherein in response to the terminal being in a connected state, the configuration information comprises at least one of:

reporting at least one of a Public Land Mobile Network (PLMN), the PCI, the cell ID, or a Cell Global Identifier (CGI);
reporting a measurement result; or
reporting position information.

15. The terminal of claim 10, wherein the transceiver is further configured to:
receive a blacklist cell list, a whitelist cell list, an other cell list, or a PCI for replacement transmitted by the network device,
wherein the blacklist cell list comprises at least one of a cell that does not belong to a present operator or a cell that does not belong to a Public Land Mobile Network (PLMN) where the terminal is registered;
the whitelist cell list comprises at least one of a cell that belongs to the present operator or a cell that belongs to the PLMN where the terminal is registered; and
the other cell list represents a cell that does not belong to a PLMN of the present operator, or a cell that does not belong to the PLMN of the present operator on a present frequency point/carrier.

* * * * *